(12) United States Patent
Chaduc et al.

(10) Patent No.: US 10,822,117 B2
(45) Date of Patent: Nov. 3, 2020

(54) OBSERVATION SYSTEM FOR AN AIRCRAFT, RELATED AIRCRAFT AND METHOD

(71) Applicant: DASSAULT AVIATION, Paris (FR)

(72) Inventors: Marc Chaduc, Le Taillan Medoc (FR); Sylvain Mateus, Ludon Medoc (FR)

(73) Assignee: DASSAULT AVIATION, Paris (FR)

( * ) Notice: Subject to any disclaimer, the term of this patent is extended or adjusted under 35 U.S.C. 154(b) by 359 days.

(21) Appl. No.: 15/589,940

(22) Filed: May 8, 2017

(65) Prior Publication Data
US 2017/0327243 A1 Nov. 16, 2017

(30) Foreign Application Priority Data
May 11, 2016 (FR) ..................... 16 00760

(51) Int. Cl.
| | | |
|---|---|---|
| *B64D 47/08* | (2006.01) | |
| *B64C 1/14* | (2006.01) | |
| *H04N 7/18* | (2006.01) | |
| *G01J 5/00* | (2006.01) | |

(52) U.S. Cl.
CPC ............ *B64D 47/08* (2013.01); *B64C 1/1407* (2013.01); *H04N 7/183* (2013.01); *G01J 2005/0077* (2013.01)

(58) Field of Classification Search
CPC .................................................... B64D 47/08
See application file for complete search history.

(56) References Cited

U.S. PATENT DOCUMENTS

| | | | |
|---|---|---|---|
| 4,188,631 A | 2/1980 | Dougherty et al. | |
| 4,593,288 A * | 6/1986 | Fitzpatrick | B64C 1/36 244/118.1 |
| 5,092,194 A * | 3/1992 | Oliver | B64D 39/04 244/135 A |

(Continued)

FOREIGN PATENT DOCUMENTS

| | | |
|---|---|---|
| EP | 1614623 A1 | 1/2006 |
| EP | 2738101 A1 | 6/2014 |

OTHER PUBLICATIONS

French Search Report for priority application.

*Primary Examiner* — Jessica B Wong
(74) *Attorney, Agent, or Firm* — Davidson, Davidson & Kappel, LLC

(57) ABSTRACT

An observation system for an aircraft, related aircraft and method are provided. The observation system includes an observation assembly deployable between a retracted inner position and a deployed outer position outside a passage opening and a deployment mechanism of the observation assembly. The system includes a hatch, mounted moving between a position closing off the passage opening and a position clearing the passage opening, and a mechanism for maneuvering the hatch between the closing off position and the clearing position. The system also includes a conjugating assembly between the mechanism for deploying the observation assembly and the mechanism for maneuvering the hatch, active over at least part of the movement of the observation assembly between the retracted position and the deployed position, to move the hatch from the closing off position to the clearing position during the movement.

14 Claims, 7 Drawing Sheets

(56) References Cited

U.S. PATENT DOCUMENTS

| | | | | |
|---|---|---|---|---|
| 5,482,228 A | * | 1/1996 | Hoshino | B64C 25/16 244/102 A |
| 2005/0029399 A1 | | 2/2005 | Lowe et al. | |
| 2006/0186270 A1 | | 8/2006 | Baderspach et al. | |
| 2009/0078827 A1 | * | 3/2009 | Martin | B60R 3/02 244/129.6 |
| 2014/0158824 A1 | | 6/2014 | L'Heritier et al. | |

* cited by examiner

OBSERVATION SYSTEM FOR AN AIRCRAFT, RELATED AIRCRAFT AND METHOD

This claims the benefit of French Patent Application FR 16 00760, filed May 11, 2016 and hereby incorporated by reference herein.

The present invention relates to an observation system for an aircraft, comprising:

a panel intended to form part of an outer skin of the aircraft, the panel defining a passage opening;

an observation assembly, including at least one sensor, the observation assembly being deployable through the passage opening between a retracted inner position and a deployed outer position outside the passage opening;

a mechanism for deploying the observation assembly between the retracted position and the deployed position;

at least one hatch, mounted moving between a position closing off the passage opening and a position clearing the passage opening;

a maneuvering mechanism for maneuvering the hatch between the closing off position and the clearing position.

Such a system is intended to be mounted in the fuselage of an aircraft to carry out observation campaigns from the aircraft. This in particular applies when the aircraft is an ocean search and rescue airplane or a surveillance drone.

Observation campaigns in particular include optical measurements done using image capture sensors. The sensors are for example optical cameras, or heat sensors of the front looking infrared (FLIR) type.

BACKGROUND

To use such sensors, it is known to mount the sensor temporarily outside the aircraft, for example below the fuselage, on a chassis fixed in the eye of the wind. In the case of an aircraft carrying weapons, the sensor can be positioned on a target designation and/or infrared imaging nacelle.

This installation principle is not satisfactory, since it significantly disrupts the aerodynamics of the aircraft during flight. Furthermore, tedious assembly/disassembly operations are necessary when the sensor is not in use.

To offset this problem, it is possible to mount the sensor on an observation assembly that is retractable inside the fuselage. Such an arrangement requires a complex mechanism to deploy the sensor as well as a mechanism to maneuver the hatches closing off the opening through which the sensor is deployed.

Such a system is therefore cumbersome, and creates complex operation and maintenance.

SUMMARY OF THE INVENTION

One aim of the invention is to provide an observation system that minimizes the aerodynamic disruptions of the aircraft, while being easier to operate and maintain.

To that end, a system of the aforementioned type is provided, characterized in that it comprises a conjugating assembly between the mechanism for deploying the observation assembly and the mechanism for maneuvering the hatch, active over at least part of the movement of the observation assembly between the retracted position and the deployed position, to move the hatch from the closing off position to the clearing position during said movement.

The system according to the invention may comprise one or more of the following features, considered alone or according to any technically possible combination:

the conjugating assembly is inactive from an intermediate position between the retracted position and the deployed position, to free the maneuvering mechanism of the hatch from the deployment mechanism of the observation assembly from the intermediate position;

the conjugating assembly includes a finger mounted moving jointly with one of the deployment mechanism and the maneuvering mechanism, the conjugating assembly defining a sliding path of the finger, jointly movable with the other of the deployment mechanism and the maneuvering mechanism;

the sliding path of the finger is open at one end, the finger being able to be released from the sliding path past the intermediate position;

the maneuvering mechanism comprises a cam movable jointly with the deployment mechanism when the conjugating assembly is active, and at least one connecting rod articulated on the cam, the connecting rod connecting the cam to the hatch;

the connecting rod is curved;

during the movement of the hatch between the closing off position and the clearing position of the passage opening, the connecting rod passes beyond an over-center point relative to the cam;

the maneuvering mechanism includes an assembly for maintaining the cam past the over-center point;

the observation assembly is mounted rotating around a first rotation axis between the retracted position and the deployed position, the hatch being mounted rotating around a second rotation axis not parallel to the first axis between the closing off position and the position clearing the passage opening;

it comprises an assembly for locking the observation assembly in its retracted position.

it comprises a plurality of parallel functional lines, connected to the observation assembly, the system comprising an assembly for guiding the functional lines when the observation assembly goes from the deployed position to the retracted position, the guiding assembly comprising an individual compartment for receiving each functional line in the retracted position of the observation assembly;

the deployment mechanism comprises at least one actuator to take the observation assembly from the retracted position to the deployed position, the maneuvering mechanism being moved exclusively by the deployment mechanism when the conjugating assembly is active.

An aircraft is also provided comprising:

an outer skin defining an inner volume;

a system as defined above, the panel forming part of the outer skin, the observation assembly being positioned in the inner volume in the retracted position.

The aircraft according to the invention may comprise one or more of the following features, considered alone or according to any technically possible combination:

the inner volume includes at least one non-pressurized compartment, advantageously situated at the rear of the aircraft, the observation assembly being accommodated in the non-pressurized compartment in the retracted position.

An in-flight observation method is also provided, comprising the following steps:

flight of an aircraft, the observation assembly occupying its retracted position, the hatch occupying its position closing off of the passage opening;

activation of the deployment mechanism to take the observation assembly from its retracted position to its deployed position;

mechanical cooperation between the deployment mechanism and the maneuvering mechanism via the conjugating assembly, to take the hatch from its closing off position to its clearing position of the passage opening;

activation of the sensor to perform an observation.

BRIEF SUMMARY OF THE DRAWINGS

The invention will be better understood upon reading the following description, provided solely as an example and done in reference to the appended drawings, in which.

DETAILED DESCRIPTION

Figure 1:
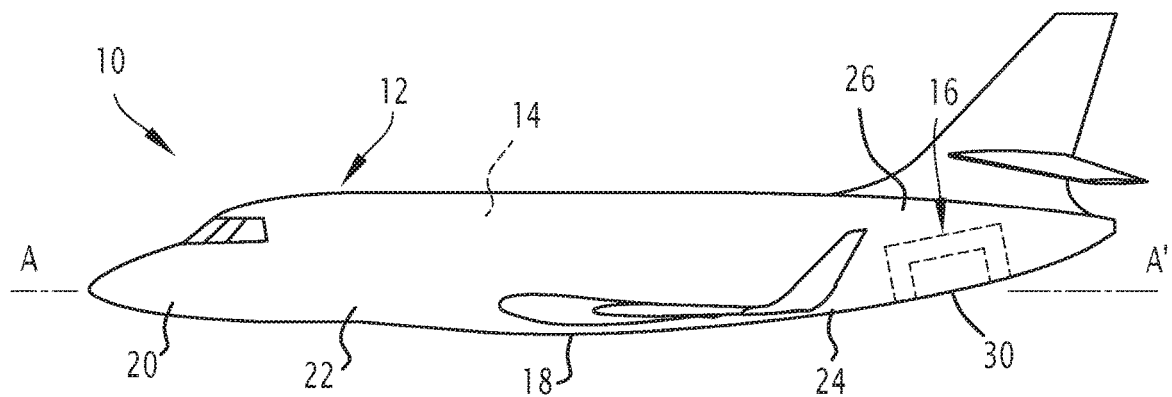
FIG. 1 is a side view of an aircraft comprising a first observation system according to an embodiment of the invention.

A first aircraft 10 according an embodiment of to the invention is illustrated by FIG. 1. The aircraft 10 comprises a fuselage 12 defining an inner volume 14. The aircraft 10 further includes an observation system 16 deployable through the fuselage 12.

The fuselage 12 includes an outer skin 18 made up of panels assembled on a framework.

The fuselage 12 extends along a longitudinal axis A-A'. Here, it comprises a forward section 20, a substantially cylindrical central region 22 and a rear region 24 converging toward the rear. In the inner volume 14, it defines at least one pressurized cabin (not shown) and at least one non-pressurized compartment 26 here containing the observation system 16 when the latter is retracted in the fuselage 12.

In this example, the non-pressurized compartment 26 is situated behind the fuselage 12 in the converging rear region 24. The observation system 16 is deployed downward from the inclined lower surface of the rear region 24.

In reference to FIGS. 2 to 7, the observation system 16 includes a panel 30 defining a passage opening 32, an observation assembly 34 deployable through the passage opening 32, and a deployment mechanism 36 for the observation assembly 34.

The observation system 16 further includes at least one hatch 38 closing off the passage opening 32, a mechanism 40 for maneuvering the hatch 38, and a conjugating assembly 42 between the deployment mechanism 36 and the maneuvering mechanism 40.

Advantageously, the observation system 16 further includes a guiding assembly 43 for functional lines 44 of the observation assembly 34 (FIGS. 11 and 12), an assembly 45 for locking the observation assembly 34 in position (FIG. 8) and a structural box 46 positioned in the inner volume 14 to receive the observation assembly 34 (FIGS. 2 to 4) and isolate the inner volume 14 from the salty outside air.

Figure 2:
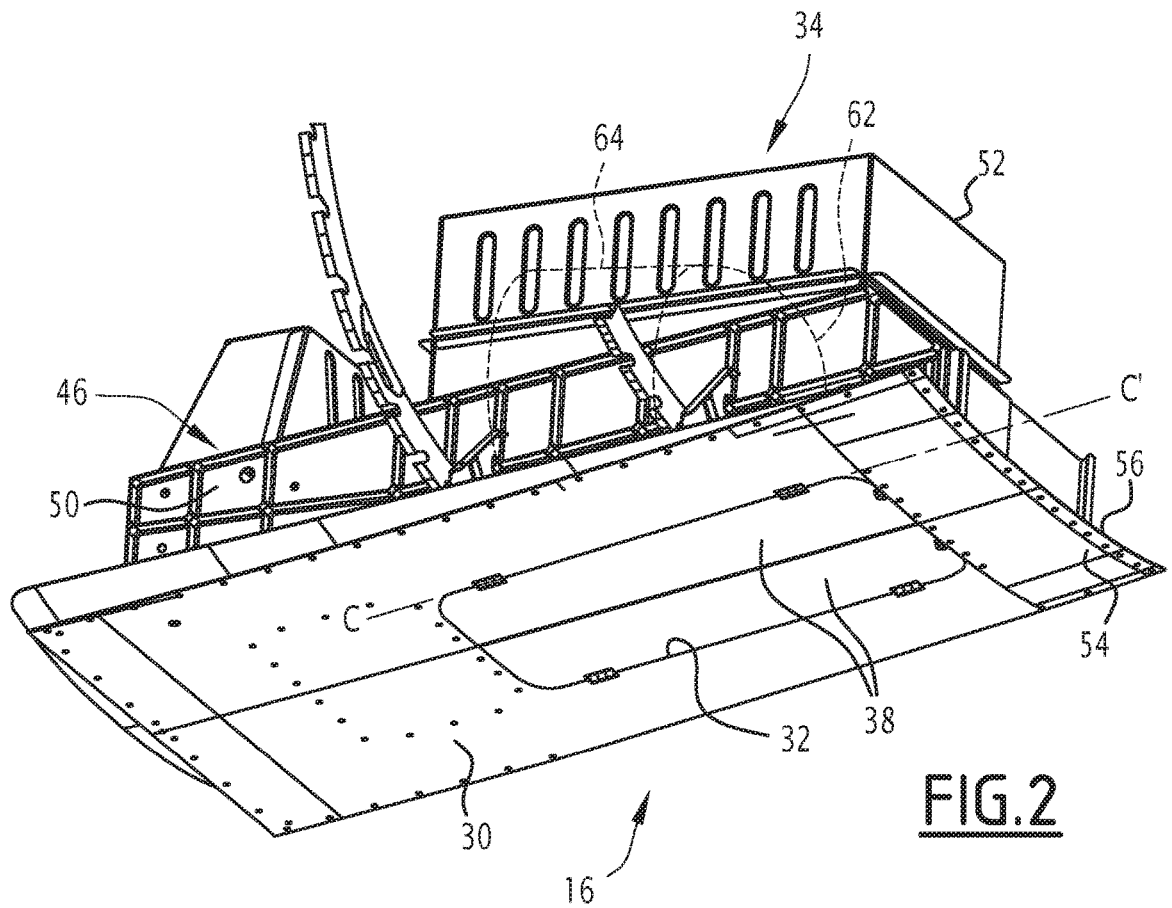
FIGS. 2 to 4 are bottom views illustrating the movement of an observation assembly of the system of FIG. 1.
Figure 3:
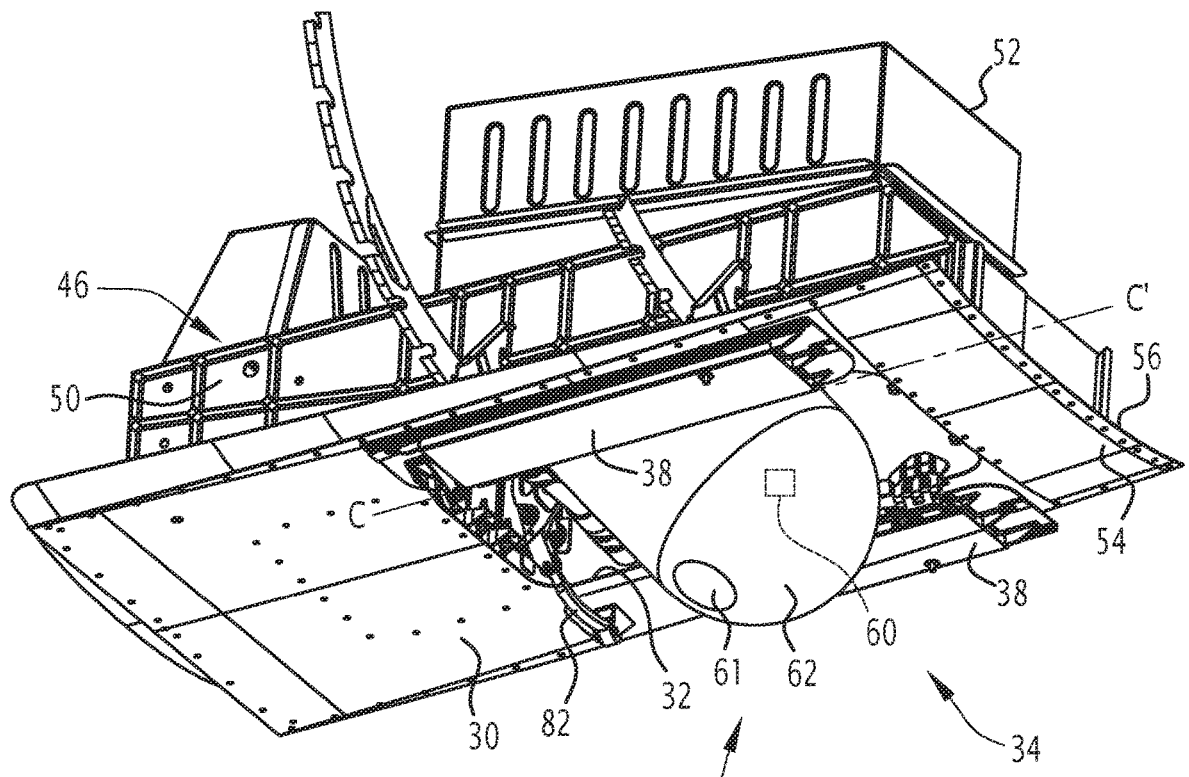

In reference to FIG. 2, the structural box 46 includes a peripheral wall 50 protruding around the passage opening 32 in the inner volume 14. It includes at least one upper cover 52, shown in dotted lines in FIG. 2, to cover the peripheral wall 50 and define, with the peripheral wall 50, a compartment for receiving the observation assembly 34. The peripheral wall 50 is inwardly provided with retaining brackets 53 of the observation assembly 34, shown in FIG. 9.

In reference to FIG. 2, the panel 30 here forms part of the outer skin 18 of the fuselage 12. It defines an outer surface 54 intended to come into contact with the mass of air in which the aircraft 10 is traveling, and an inner surface 56 outwardly defining the inner volume 14.

The passage opening 32 traverses the panel 30 between the inner surface 56 and the outer surface 54. Here is has an elongated, substantially rectangular shape.

In reference to FIGS. 2 to 7, the observation assembly 34 includes at least one sensor 60, a support 62 protecting the sensor 60 and a seat 64 intended to carry the sensor 60 and its support 62.

The sensor 60 is for example a sensor for optical measurements done using an image or signal acquisition. The sensor is for example an optical camera, traveling in the optical field and able to take images of the terrain situated opposite the aircraft 10. Advantageously, the sensor 60 is a heat sensor of the front looking infrared (FLIR) type traveling in the infrared domain.

The protection support 62 here is formed by a dome inwardly receiving the sensor 60. The dome has a downwardly rounded shape and at least one observation window 61 (see FIG. 3) behind which the sensor 60 is placed.

The seat 64 carries the protection support 62 and the sensor 60. It upwardly closes the protection support 62, above the sensor 60. It is connected to the deployment mechanism 36. The seat 64 includes flexible side stops 63, visible in FIG. 9, able to cooperate with the retaining brackets 53, when the observation assembly 34 is deployed.

As will be seen below, the observation assembly 34 is deployable through the passage opening 32, between a position retracted in the inner volume 14, and a downwardly deployed outer position, outside the passage opening 32.

Figure 5:
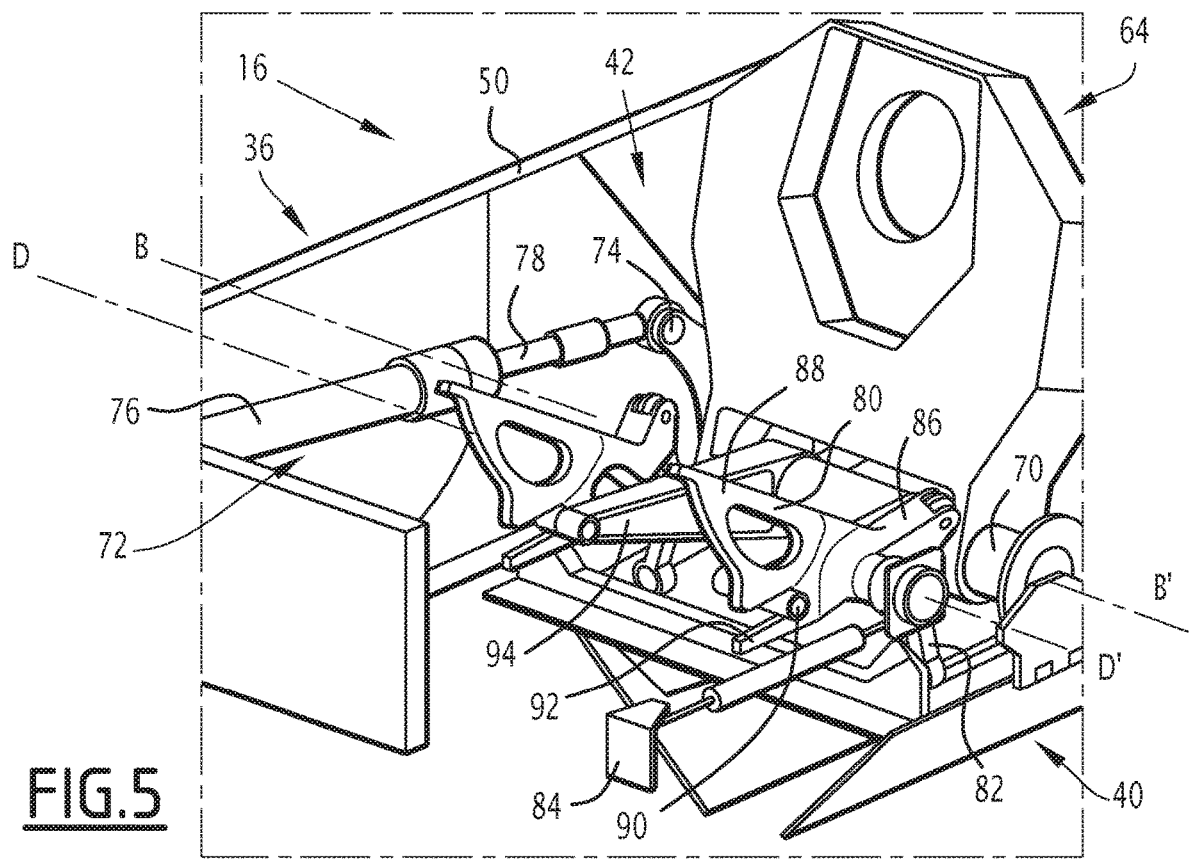
FIGS. 5 to 7 are top views similar to FIGS. 2 to 4.
Figure 6:
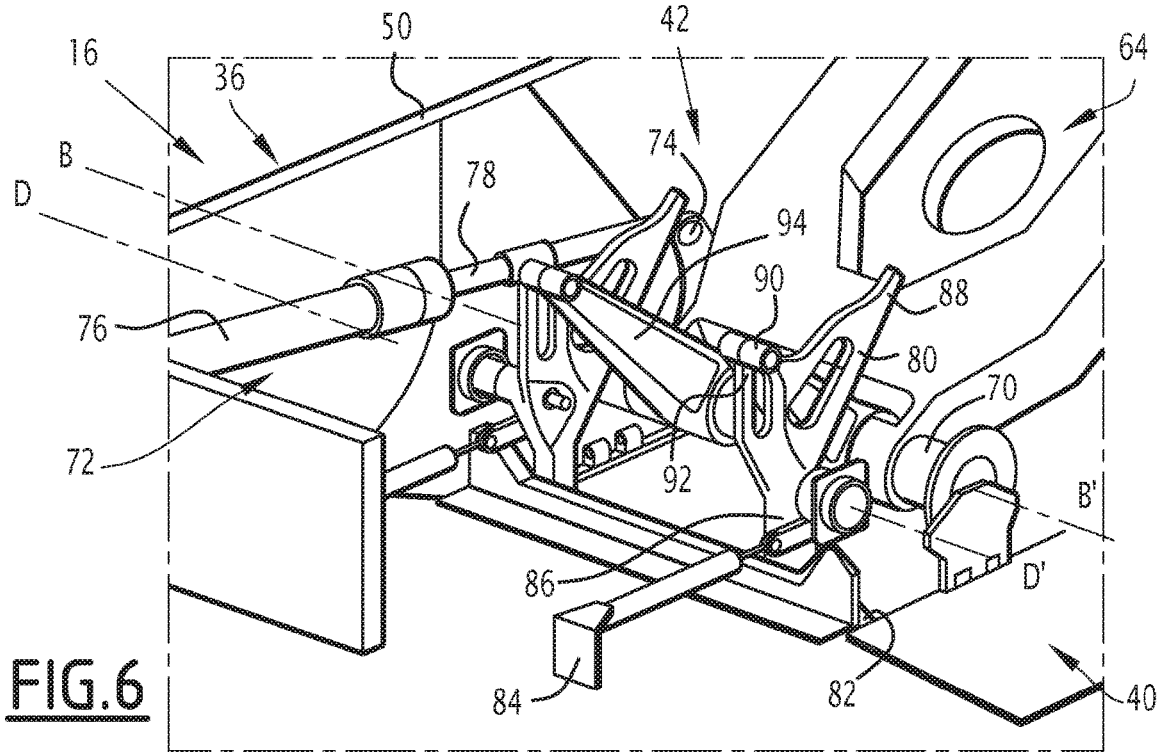
Figure 7:
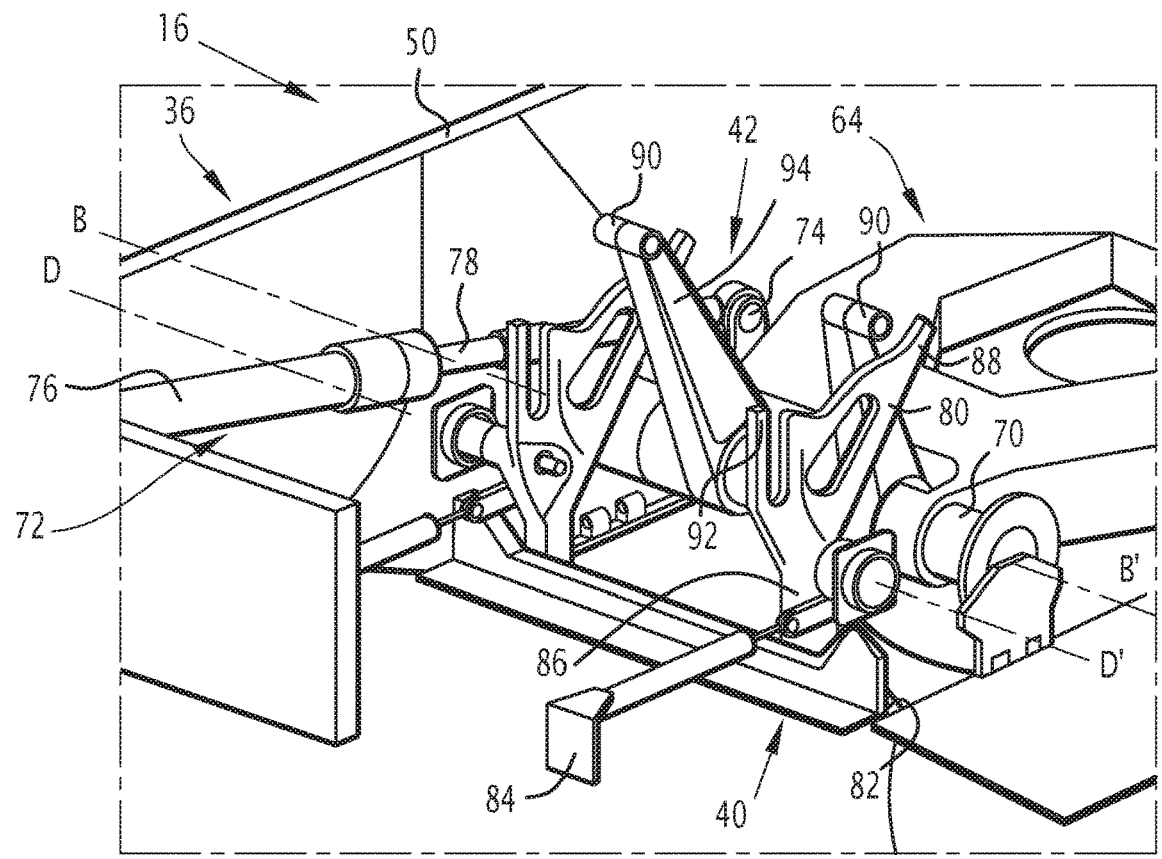

In reference to FIGS. 5 to 7, the deployment mechanism 36 includes a shaft 70, on which the observation assembly 34, an actuator 72 for moving the observation assembly 34 between the inner position and the outer position, and a leading edge countershaft 74 connecting the shaft 70 to the actuator 72 are mounted.

The shaft 70 is mounted rotating relative to the panel 30 around an axis B-B', which here is substantially horizontal. The seat 64 is mounted stationary on the shaft 70, advantageously via two side arms. The seat 64 is thus rotatable jointly with the shaft 70 around the axis B-B' between the outer position and the inner position.

The actuator 72 here includes a jack including a cylinder 76 and a rod 78 deployable relative to the cylinder 76, upon receiving a deployment or retraction order of the observation assembly 34.

In this example, the rod 78 extends along an axis substantially perpendicular to the rotation axis B-B'.

The leading edge countershaft 74 is mounted stationary on the shaft 70 to be moved jointly with the shaft 70 around the axis B-B'. It is articulated on one end of the rod 78.

When the rod 78 is retracted in the cylinder 76 (see FIG. 5), the seat 64 follows a rotational movement to withdraw in the inner volume 14, near the cylinder 76. At the end of travel, the seat 64 extends substantially vertically in the inner volume 14. The sensor support 62 and the sensor 60 are received in the inner volume 14 and protrude substantially horizontally from the seat 64. The observation assembly 34 is in its position retracted in the inner volume 14 (see FIG. 2).

When the rod 78 is deployed outside the cylinder 76, the leading edge countershaft 74 has been moved away from the cylinder 76. This movement has caused the joint rotation of the shaft 70, the sensor support 62 and the sensor 60 around the axis B-B' to deploy them downward outside the inner volume 14, through the passage opening 32. The observation assembly 34 is then in its position deployed outside the passage opening 32, in particular shown in FIG. 4, when the stops 63 are in contact with the brackets 53 (see FIG. 9).

In this example, in reference to FIG. 2, the observation system 16 includes two parallel hatches 38. Each hatch 38 is deployable sideways relative to the passage opening 32 between a position closing off the opening 32 and a position clearing the opening 32. In this example, each hatch 38 is mounted rotating around an axis C-C' between the closing off position and the clearing position.

In the closing off position shown in FIG. 2, each hatch 38 is positioned in the passage opening 32. Its outer surface is advantageously flush with the outer surface 54 of the panel 30. The passage opening 32 is outwardly closed by the hatches 38.

Figure 4:
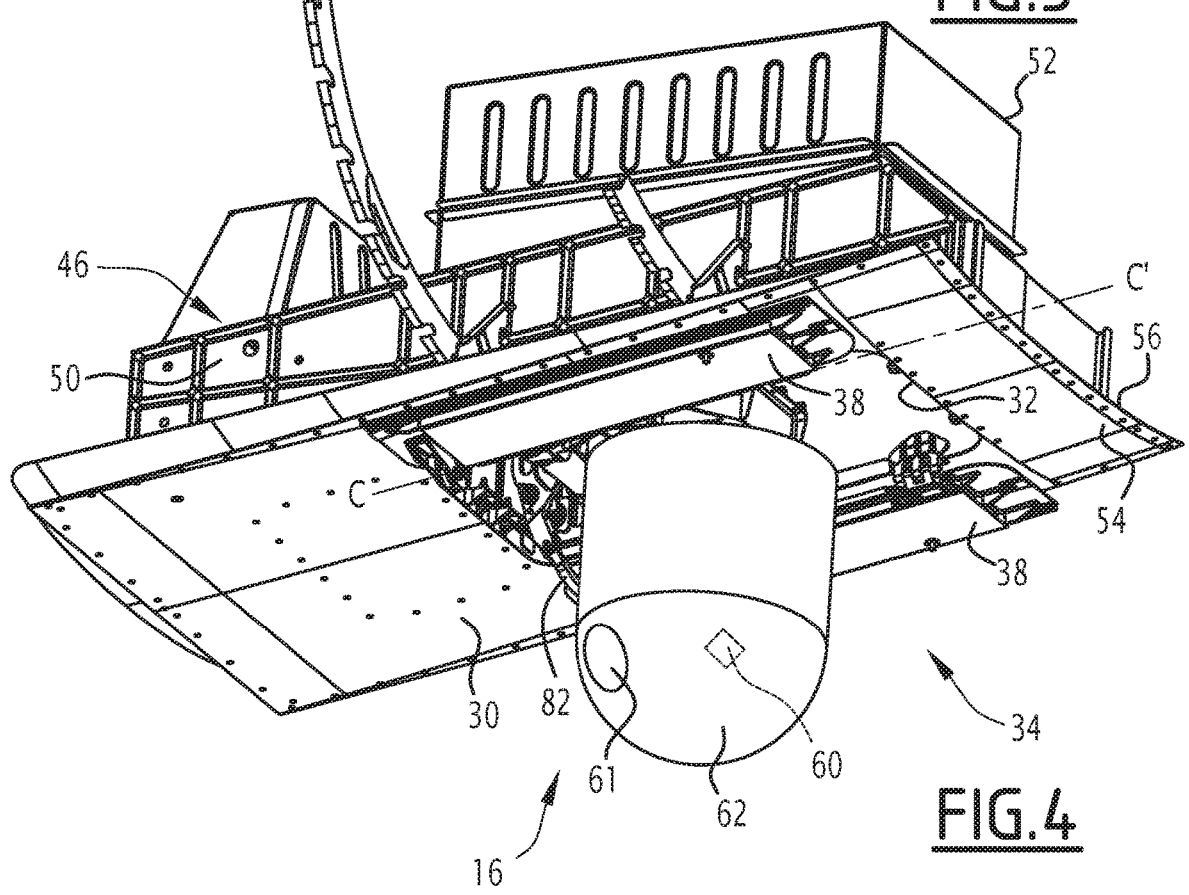

In the clearing position, shown in FIG. 4, each hatch 38 has been moved outside the opening 32, preferably sideways relative thereto. In the example shown in the figures, the hatch 38 has been pivoted around the axis C-C' to press at the periphery of the opening 32 opposite the outer surface 54.

In reference to FIGS. 5 to 7, the maneuvering mechanism 40 includes, for each hatch 38, a cam 80 mounted rotating relative to the panel 30 around an axis D-D' parallel to the rotation axis B-B' of the shaft 70, at least one connecting rod 82 between the cam 80 and the hatch 38, able to over-center itself relative to the cam 80 beyond an intermediate position of the cam 80, and an assembly 84 for keeping the cam 80 in the over-centered position.

The cam 80 extends in front of the shaft 70. Here, it has a substantially flat shape in a plane perpendicular to the axis D-D'. It includes a first articulation arm 86 to the connecting rod 82 situated on one side of the axis D-D' and a second arm 88 cooperating with the deployment mechanism 36, situated on another side of the axis D-D'.

The cam 80 is able to pivot around the axis D-D' between a withdrawn position keeping the hatch 38 in the closing off position and a deployed position keeping the hatch 38 in the open position.

In the withdrawn position, the arm 86 extends upward and the arm 88 extends downward in the box 46.

In the deployed position, the first arm 86 points downward through the passage opening 32. The second arm 88 points upward in the box 46.

The connecting rod 82 has a curved shape, advantageously an arc of circle. It extends substantially perpendicular to the cam 80, with its convex side oriented downward. It is articulated a first end on the arm 84 of the cam 80 and at a second end on the hatch 38.

When the cam 80 moves from the withdrawn position toward the deployed position, the connecting rod 82 moves away from the cam 80 sideways and causes the hatch 38 to open. It passes through an end-of-travel over-center midpoint, allowing the non-return of the hatch 38, once in the final released position.

Before passing by the over-center point, in the movement direction of the cam 80 from the withdrawn position to the deployed position, the connecting rod 82 is stressed away from the cam 80 to move the hatch 38 toward its maximum clearing position.

After passing by the over-center point, still in the movement direction of the cam 80 from the withdrawn position to the deployed position, the connecting rod 82 is stressed toward the cam 80 to bring the hatch 38 partially back toward the closing off position, to reach the final clearing position.

The conjugating assembled 42 is active to cause the mechanism 36 for deploying the observation assembly 34 to cooperate mechanically with the mechanism 40 for maneuvering the hatch 38 over at least part of the movement of the observation assembly 34 between the retracted position and the deployed position.

In the example shown in the figures, the conjugating assembly 42 is inactive from an intermediate position of the observation assembly 34 between the retracted position and the deployed position, to free the maneuvering mechanism 40 of the hatch 38 from the deployment mechanism 36 of the observation assembly 34 from the intermediate position.

To that end, the conjugating assembly 42 includes, for each hatch 38, a finger 90 mounted moving jointly with one of the deployment mechanism 36 and the maneuvering mechanism 40. The conjugating assembly 42 defines a sliding path 92 for the finger 90, moving jointly with the other of the deployment mechanism 36 and the maneuvering mechanism 40.

In this example, each finger 90 is mounted jointly movable with the deployment mechanism 36 of the observation assembly 34. For each finger 90, the conjugating assembly 42 includes a countershaft 94 fastened on the shaft 70 to be rotatable around the axis B-B' jointly with the shaft 70. The finger 90 protrudes sideways at the end of the countershaft 94, advantageously parallel to the axis B-B'.

The sliding path 92 of the finger 90 is defined in the cam 80, at the second arm 88. It opens at one end to free the finger 90 from the sliding path 92, from the final clearing position.

In this example, the sliding path 92 extends linearly. It opens upward when the cam 80 is in its deployed position, with the arm 88 pointing upward.

When the finger 90 is received in the sliding path 92, the conjugating assembly 42 is active so that the rotation of the deployment mechanism 36 around the axis B-B', in particular the rotation of the shaft 70, is transmitted to the maneuvering mechanism 40 in order to rotate the cam 80 and cause the sideways movement of the connecting rod 82.

When the finger 90 leaves the sliding path 92, the conjugating assembly 42 becomes inactive. The rotation of the deployment mechanism 36 around the axis B-B', in particular the rotation of the shaft 70, is no longer transmitted to the maneuvering mechanism 40. The observation assembly 34 can be moved independently of the cam 80.

Figure 8:
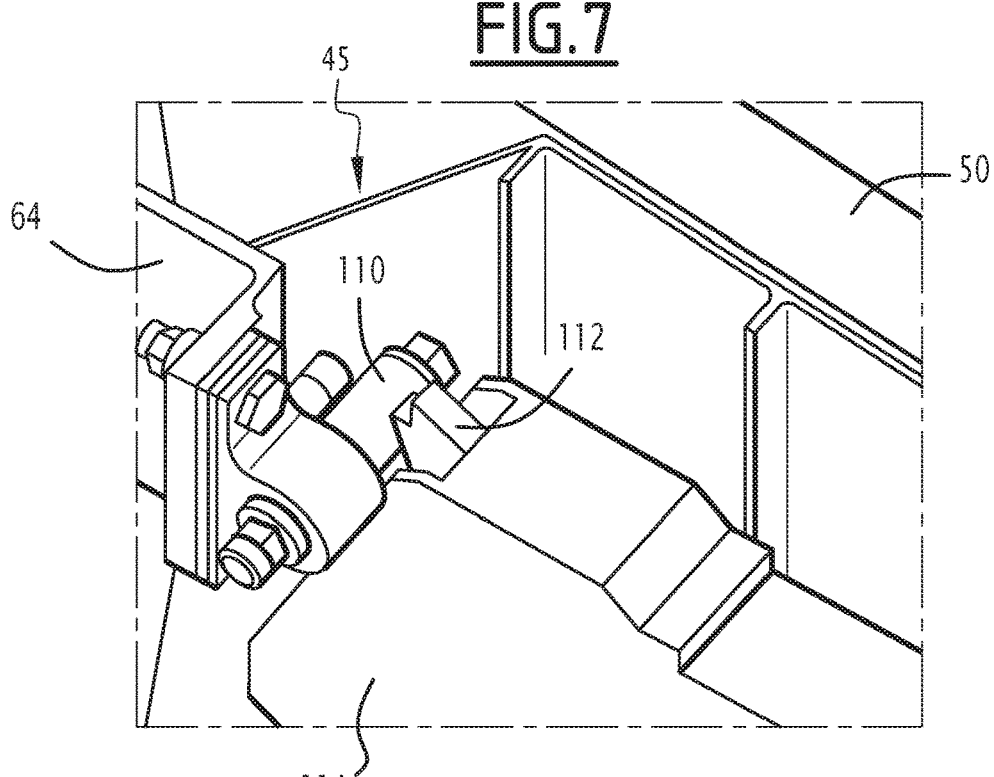
FIG. 8 is a partial top view illustrating a locking assembly of the observation assembly.

In reference to FIG. 8, the locking assembly 45 includes a locking stop 110 mounted on the seat 64, a finger 112 capturing the locking stop 110 and a hydraulic system 114 keeping the capturing finger 112 in position.

When the deployment mechanism 36 is in its retracted inner position, the capturing finger 112 is able to grasp and releasably block the locking stop 110.

Figure 10:
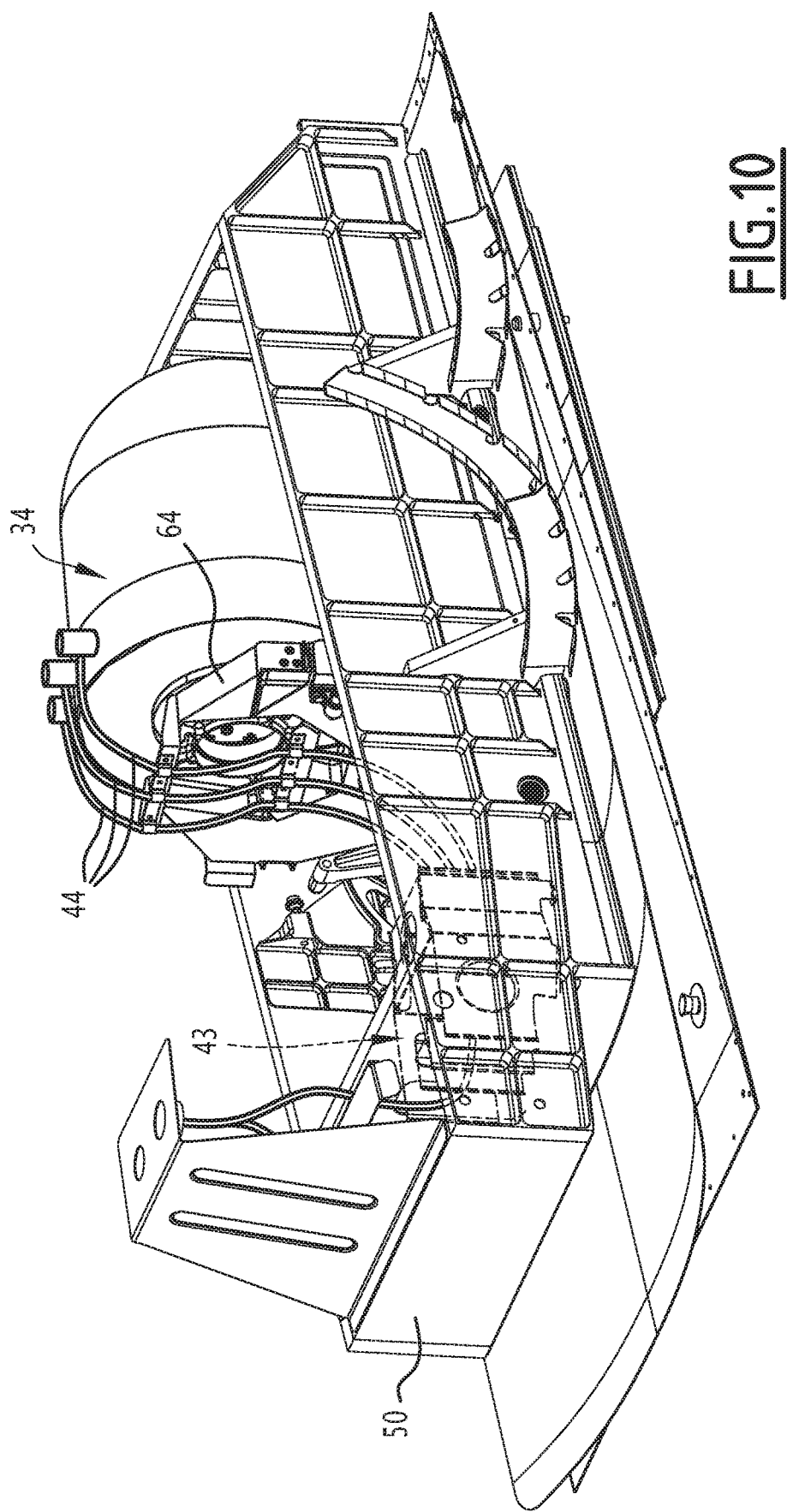
FIGS. 10 and 11 show the guiding of functional lines connected to the observation assembly.
Figure 11:
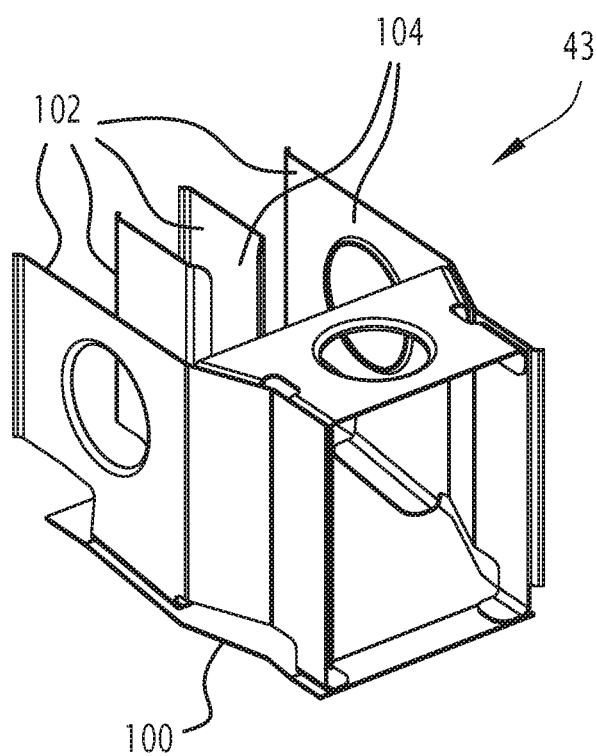

In reference to FIGS. 10 and 11, a plurality of flexible functional lines 44 are fastened on the observation assembly 34. At least one line 44 is advantageously connected to the sensor 60. The guiding assembly 43 includes a guide 100 comprising a plurality of parallel walls 102 defining individual compartments 104 between them for receiving a flexible functional line 44.

The operation of the observation system 16 will now be described.

Initially, the observation assembly 34 is placed in the retracted inner position. It is completely received in the inner volume 14, in the structural box 46 defined by the peripheral wall 50 and by the cover 52.

The seat 64 is positioned substantially vertically. The locking stop 110 is received in the capturing finger 112 and is kept in this position by the hydraulic system 114.

The sensor support 62 and the sensor 60 extend longitudinally in the inner volume 14.

The rod 78 is retracted in the cylinder 76. The leading edge countershaft 74 is positioned near the cylinder 76.

As illustrated in FIG. 5, the cam 80 is in its withdrawn position. The connecting rod 82 is situated in its position laterally near the cam 80. Each hatch 38 is kept in its position closing off the passage opening 32.

Thus, the passage opening 32 is closed and each hatch 38 is flush with the outer surface 54 of the panel 30, as shown in FIG. 2. The aerodynamic disruption caused by the observation system 16 is therefore practically nonexistent in this configuration, both for takeoff of the aircraft 10 and during flight thereof, before deployment of the observation system 16.

The conjugating assembly 42 is active. Each finger 90 at the end of a countershaft 94 extends in a corresponding sliding path 92, substantially at the bottom of this path 92.

When the aircraft 10 must observe a zone, the hydraulic system 114 is deactivated to free the capturing finger 112 from the locking stop 110.

Then, the actuator 72 is activated. The rod 78 is deployed outside the cylinder 76 along its axis. The leading edge countershaft 74 moves away from the cylinder 76 by pivoting around the axis B-B'.

The pivoting of the leading edge countershaft 74 rotates the shaft 70 around the axis B-B'. During this movement, the finger 90 engaged in the sliding path 92 pivots jointly with the shaft 70 and rotates the cam 80 around the axis B-B'.

The connecting rod 82 gradually moves away from the cam 80, causing the hatch 38 to rotate around the axis C-C' and gradually go from the closing off position to the clearing position.

During this movement, the finger 90 gradually rises in the sliding path 92. Furthermore, the connecting rod 82 goes by its over-centered position, substantially at the end of travel.

In an intermediate position of the observation assembly 34 between the retracted inner position and the deployed position, the finger 90 is removed from the sliding path 92 and disengages from the cam 80. The conjugating assembly 42 is then inactive.

Under the effect of the maintaining assembly 84, the cam 80 remains kept in the deployed position, with its arm 88 pointing upward and with the connecting rod 82 in an over-centered position. Each hatch 38 thus remains in its position clearing the passage opening 32. The passage opening 32 is completely clearing.

Figure 9:
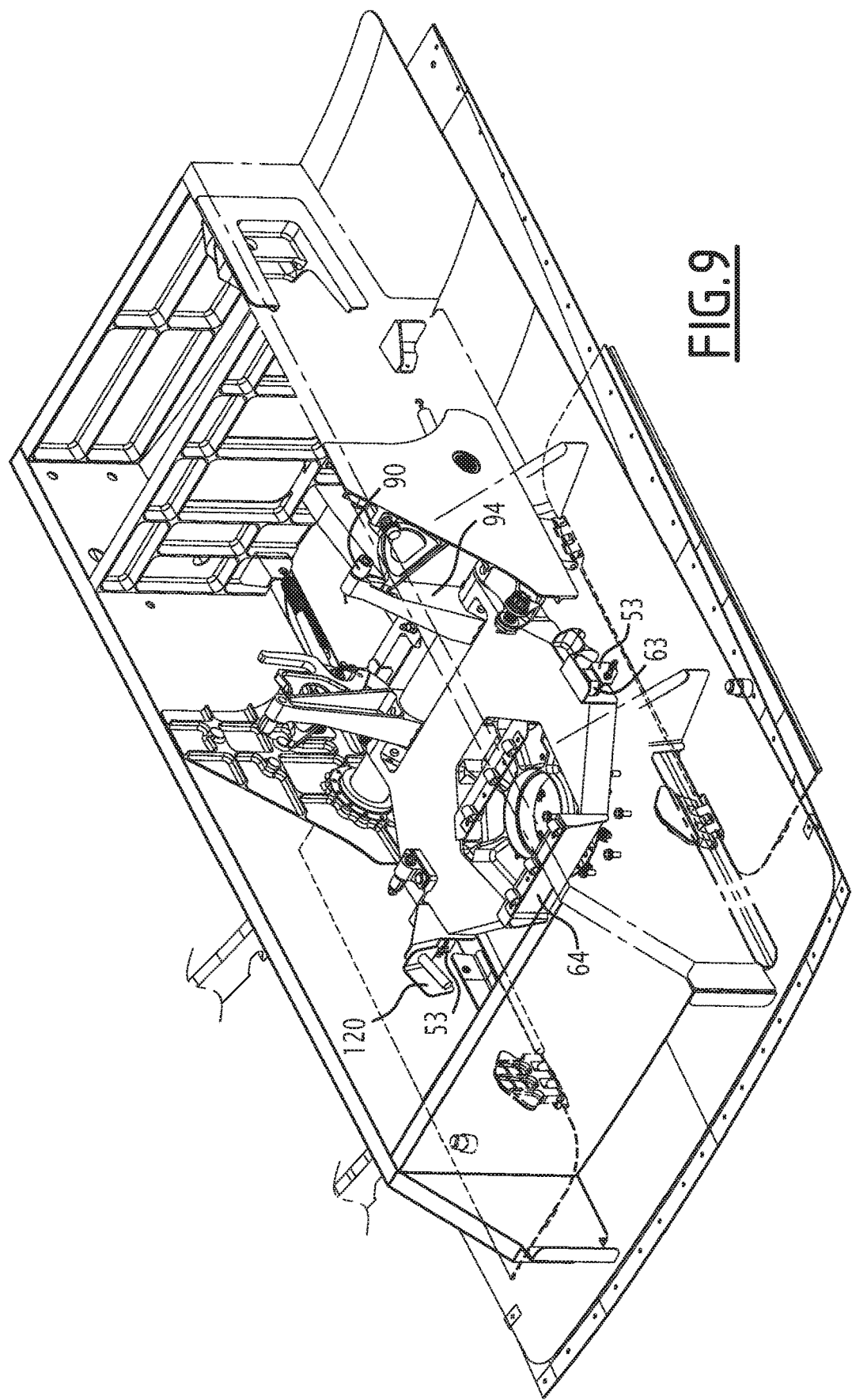
FIG. 9 illustrates stops for blocking the observation assembly in the deployed position that are positioned on corresponding brackets.

The rotation of the shaft 70 around the axis B-B' then continues, without rotating the cam 80. When the side stops 63, come into contact with the retaining brackets 53, as shown in FIG. 9, the observation assembly 34 is in its deployed position. The functional lines 44 are deployed outside the compartments 104 of the guide 100.

The seat 64 then extends substantially horizontally. The sensor 60 and its support 62 protrude downward through the opening 32, outside the inner volume 14, past the outer surface 54 of the panel 30.

Advantageously, a detector 120 (see FIG. 9) indicates to the crew of the aircraft 10 that the observation assembly 34 has reached its deployed position.

The sensor 60 is then activated to carry out an observation. Its downward deployment is sufficient to observe both the terrain situated in front of the aircraft 10 under the fuselage 12, and below the latter.

When the observation is complete, the actuator 72 is activated to retract the rod 78 in the cylinder 76. This causes the leading edge countershaft 74 to come closer to the cylinder 76 and causes the shaft 70 to pivot in the direction opposite the movement direction during the deployment of the observation assembly 34. The functional lines 44 then fold in the structural box 46, while each being guided in an individual receiving compartment 104. The risk of tangling of the lines 44 is therefore greatly limited.

When the observation assembly 34 reaches the intermediate position between the deployed position and the retracted position, the finger 90 penetrates the sliding path 92 and the conjugating assembly 42 is activated again.

The downward rotation of the finger 90 frees the assembly 84 maintaining the cam 80. The finger 90 then rotates the cam 80 toward its withdrawn position, which causes the connecting rod 82 to come closer to the cam 80 and causes the hatch 38 to pivot.

When the cam 80 reaches its withdrawn position, each hatch 38 once again occupies its closing off position.

The observation assembly 34 is then in its retracted position. The seat 64 extends substantially vertically and the capturing finger 112 is activated to grasp the locking stop 110 and keep it in position using the hydraulic system 114.

The observation system 16 is therefore very easily deployable and retractable, using a mechanism that requires a single actuator 72 to activate both the deployment mechanism 36 and the maneuvering mechanism 40 over part of the travel of the deployment mechanism 36.

This greatly simplifies the structure of the observation system 16, improves its reliability and facilitates its maintenance.

What is claimed is:

1. An observation system for an aircraft, comprising:
   a panel configured to form part of an outer skin of the aircraft, the panel defining a passage opening;
   an observation assembly including at least one sensor, the observation assembly being deployable through the passage opening between a retracted inner position and a deployed outer position deployed outside the passage opening;
   a deploying mechanism for deploying the observation assembly between the retracted position and the deployed position;
   at least one hatch mounted for moving between a closing off position closing off the passage opening and a clearing position clearing the passage opening; and
   a maneuvering mechanism for maneuvering the hatch between the closing off position and the clearing position,
   the deploying mechanism and the maneuvering mechanism being detachably connected, during at least a part of the movement of the observation assembly between the retracted position and the deployed position, to move the hatch from the closing off position to the clearing position during the at least part of the movement, the maneuvering mechanism being detached from the deploying mechanism past an intermediate position positioned between the retracted position and the deployed position.

2. The system according to claim 1, wherein the maneuvering mechanism comprises a cam movable jointly with the deployment mechanism when the deploying mechanism and the maneuvering mechanism are connected, and at least one connecting rod articulated on the cam, the connecting rod connecting the cam to the hatch.

3. The system according to claim 2, wherein the connecting rod is curved.

4. The system according to claim 2, wherein, during the movement of the hatch between the closing off position and the clearing position of the passage opening, the connecting rod passes beyond an over-center point relative to the cam.

5. The system according to claim 4, wherein the maneuvering mechanism includes a maintainer for maintaining the cam past the over-center point.

6. The system according to claim 1, wherein the observation assembly is mounted for rotating around a first rotation axis between the retracted position and the deployed position, the hatch being mounted for rotating around a second rotation axis not parallel to the first axis between the closing off position and the position clearing the passage opening.

7. The system according to claim 1 further comprising a locking assembly for locking the observation assembly in the retracted position.

8. The system according to claim 1 further comprising:
a plurality of parallel functional lines connected to the observation assembly; and
a guide for guiding the functional lines when the observation assembly goes from the deployed position to the retracted position, the guide comprising an individual compartment for receiving each functional line in the retracted position of the observation assembly.

9. The system according to claim 1, wherein the deployment mechanism comprises at least one actuator to take the observation assembly from the retracted position to the deployed position, the maneuvering mechanism being moved exclusively by the deployment mechanism when the deploying mechanism and the maneuvering mechanism are connected.

10. An aircraft, comprising:
an outer skin defining an inner volume;
the system according to claim 1, the panel forming part of the outer skin, the observation assembly being positioned in the inner volume in the retracted position.

11. The aircraft according to claim 10, wherein the inner volume includes at least one non-pressurized compartment, the observation assembly being accommodated in the non-pressurized compartment in the retracted position.

12. The aircraft according to claim 11, wherein the at least one non-pressurized compartment is situated at the rear of the aircraft.

13. An in-flight observation method, comprising the following steps:
flying the aircraft according to claim 10, the observation assembly occupying the retracted position, the hatch occupying the position closing off of the passage opening;
activating the deployment mechanism to take the observation assembly from the retracted position to the deployed position;
mechanical cooperation between the deployment mechanism and the maneuvering mechanism, to take the hatch from the closing off position to the clearing position of the passage opening; and
activating the sensor to perform an observation.

14. An observation system for an aircraft, comprising:
a panel configured to form part of an outer skin of the aircraft, the panel defining a passage opening;
an observation assembly including at least one sensor, the observation assembly being deployable through the passage opening between a retracted inner position and a deployed outer position deployed outside the passage opening;
a deploying mechanism for deploying the observation assembly between the retracted position and the deployed position;
at least one hatch mounted for moving between a closing off position closing off the passage opening and a clearing position clearing the passage opening; and
a maneuvering mechanism for maneuvering the hatch between the closing off position and the clearing position,
the deploying mechanism and the maneuvering mechanism being detachably connected, during at least a part of the movement of the observation assembly between the retracted position and the deployed position, to move the hatch from the closing off position to the clearing position during the at least part of the movement, the maneuvering mechanism being detached from the deploying mechanism past an intermediate position positioned between the retracted position and the deployed position;
the system further comprising a finger mounted moving jointly with one of the deployment mechanism and the maneuvering mechanism, and a sliding path of the finger, jointly movable with another one of the deployment mechanism and of the maneuvering mechanism, the sliding path of the finger being open at one end, the finger being releasable from the sliding path past the intermediate position.

* * * * *